B. G. Swain,
Curd Cutter.
No. 107,423.  Patented Sep. 13. 1870.
Fig. I
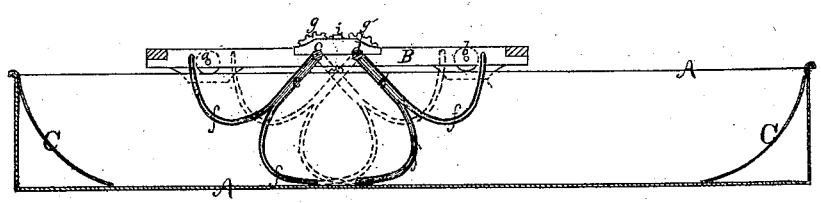
Fig. II
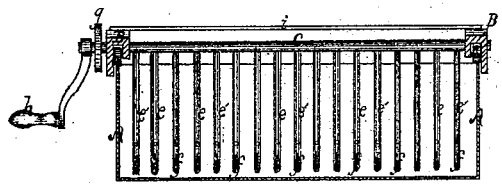
Fig. IV   Fig. III
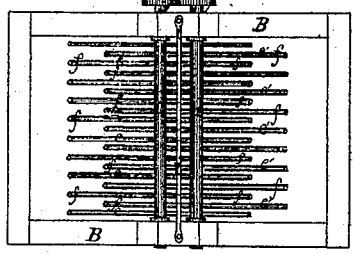 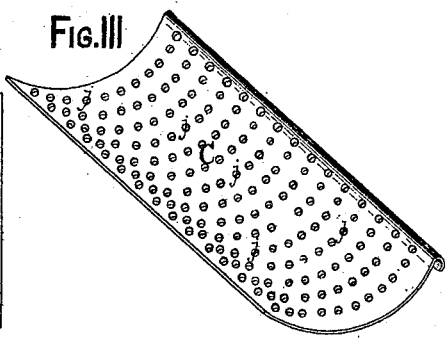
WITNESSES.
J. R. Drake
C. H. Woodward.
Byron G. Swain INVENTOR.
J. Fraser & Co.
Attys.

United States Patent Office.

BYRON G. SWAIN, OF COLDEN, NEW YORK.

Letters Patent No. 107,423, dated September 13, 1870.

---

IMPROVEMENT IN CURD-AGITATORS.

---

The Schedule referred to in these Letters Patent and making part of the same

---

To all whom it may concern:

Be it known that I, BYRON G. SWAIN, of Colden, in the county of Erie and State of New York, have invented certain new and useful Improvements in "Curd-Agitators," of which the following is a specification.

Nature of Invention.

This invention consists in an agitator, of peculiar construction and form, mounted in a frame which is changeable to any position on the vat, or to fit on different vats.

It also consists in the peculiar form of the fingers for agitating the curd.

Description.

In the drawing—

Figure 1 is a vertical longitudinal section of a vat, with my improvement applied thereto.

Figure 2 is a cross-section of the same.

Figure 3, a perspective of one of the strainers detached.

Figure 4, a plan of the agitator removed from place.

A is the vat in which the curd stands.

B, an oblong rectangular frame, which sets on top of the vat, and is moved backward and forward on small rollers $a\ b$, set in the frame, and running on the sides of the vat to facilitate the movement.

At points near and across the center of the frame, two shafts, $c\ d$, are placed, working in suitable journals, having intermatching gears $g\ g'$, and a crank, $h$, outside.

Fastened to each shaft, and depending downward into the vat, is a series of arms or agitators, $e\ e$, placed on the two shafts alternately in position, so that they do not interfere in moving backward and forward, but intermatch each other, (see fig. 4.)

Each of these arms is provided with curved fingers $f\ f$, one bending forward and upward, and the other bending backward and upward.

A stay-rod, $i$, extends across the frame centrally, to prevent the arms rising too high. It also serves as a handle to the agitator-frame.

The operation is as follows:

The curd being placed in the vat, the agitator B is rested at any desired position on top of the same, and the crank $h$ vibrated alternately forward and back, which gives a semi-rotary action to the arms $e$ sufficient to raise the curved fingers of the same upward to the surface of the curd. This peculiar form of the fingers serves an important purpose in elevating the curd, raising it up, and allowing it to drop back, thereby thoroughly stirring, agitating, and mixing it, which is not done by the ordinary straight knives or arms, which simply cut through without raising the material.

I claim a great advantage from this form of the fingers in stirring the curd vertically, instead of simply moving it horizontally, as thereby much less action and power are required, and greater agitation produced.

Another important advantage of my construction is, that the agitator B, with the operating parts attached, simply rests loosely on top of the vat, and may be moved from one position to another, and retained there as long as desired. This is desirable, as some portions of the curd are thicker and tougher than others.

In ordinary vats of this kind the agitator is automatic in its movement, traversing unvaryingly from one end to the other, as in Keeney's patent of August 29, 1865. By my construction the agitator can also be expeditiously removed from one vat to another by simply lifting off.

As a quantity of the curd will of necessity get into the corners of the vat, out of the reach of the agitating-fingers, I introduce into each end a piece of rounded or concave metal, C, which is full of small holes, $j\ j$, and fits close to the sides of the vat. Its object is twofold: It is used, first, to clear the curd from the corners, and, when fitted in, its shape corresponds to the shape of the rounded fingers of the agitators; it also acts as a strainer, whereby the whey is strained through at each end from the mass thrown against it.

I am aware that vats with rounded ends have been constructed, but such are not removable, nor are they made as strainers—a double effect, which I believe is new.

Claims.

What I claim as my invention, and desire to secure by Letters Patent, is—

1. The construction and arrangement of the agitator as herein described, the same consisting of the shafts $c\ d$, with arms $e\ e'$ mounted in the removable frame B, and operated by gears $g\ g'$, or equivalent, in the manner and for the purpose specified.

2. The arms $e\ e'$, provided with the oppositely-bending fingers $f\ f'$, operating in the manner and for the purpose specified.

In witness whereof I have hereunto signed my name in the presence of two subscribing witnesses.

BYRON G. SWAIN.

Witnesses:
J. R. DRAKE,
ALBERT HAIGHT.